Jan. 11, 1955  E. ZIELER  2,699,506
DEVICE FOR MEASURING THE X-RAY ENERGY OF AN X-RAY TUBE
Filed May 8, 1951
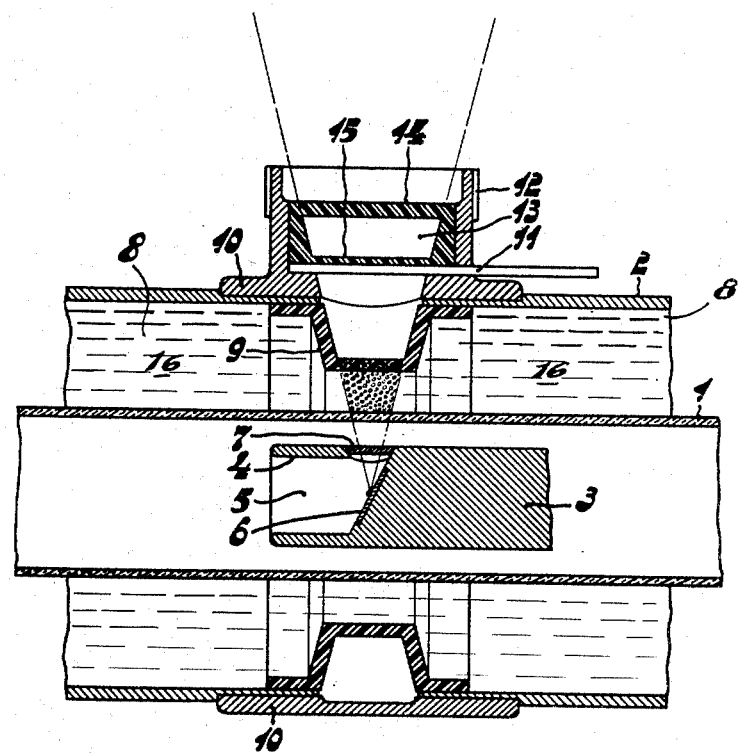
INVENTOR
ERICH ZIELER
BY *Fred M. Vogel*
AGENT

United States Patent Office 2,699,506
Patented Jan. 11, 1955

2,699,506

DEVICE FOR MEASURING THE X-RAY ENERGY OF AN X-RAY TUBE

Erich Zieler, Hamburg-Wentorf, Germany, assignor to Hartford National Bank and Trust Company, Hartford, Conn., as trustee Application May 8, 1951, Serial No. 225,128

Claims priority, application Germany November 2, 1950

4 Claims. (Cl. 250—83.6)

The radiation emitted by an X-ray tube may be measured with the use of an electric measuring apparatus connected to the current circuit of an ionisation chamber exposed to the X-rays.

Usually the strength of the current across the ionisation chamber, which is spaced apart from the source of radiation by a comparatively large distance, is so low that its measurement requires an extremely sensitive and accurately constructed measuring apparatus. However, if use is made of a large size ionisation chamber and if it is arranged near to the source of radiation, simply a microampere meter may be used for the measurement. An ionisation chamber of a capacity suitable for this purpose will be referred to hereinafter as a "large ionisation chamber."

A disadvantage of the arrangement of the ionisation chamber in the proximity of the source of radiation is formed by the phenomenon that the intensity of the radiation in situ varies to a greater extent with the hardness of the rays than at a point farther away from the source of radiation. This disadvantage is particularly evident, if the X-ray tube is housed in an oil-filled safety shield. The said phenomenon is due to stray of the X-rays in the substance which the rays have to penetrate, in this case the wall of the safety shield and the insulating liquid between this wall and the X-ray tube. This substance operates as a source of secondary rays in the form of a spatial body. The share of the secondary radiation in the total radiation, which may even be 40% in the close proximity of the X-ray tube, varies to an appreciable extent with the hardness of the rays and hence, at a given intensity of the primary radiation the current across the ionisation chamber is the higher, the harder the radiation is. As far as the measurement is concerned, this would not be an objection, if at the area where the X-rays have to perform their function the intensity should vary proportionally with the wavelength of the X-rays. However, this is not the case. The effect of the wavelength on the radiation energy collected in situ is smaller, since in proportion to the primary radiation the secondary radiation decreases according as the distance increases.

In view of the effect of the wavelength on the phenomenon of stray, we may therefore conclude that the strength of the ionisation current of the measuring device increases to a higher extent with the increase in hardness than the intensity of the rays collected in the area of use and that, consequently, the measuring apparatus does not give a reliable indication of the effective radiation energy per unit time, since the calibration constant, i. e. the number of effective r/min. corresponding to a scale division of the measuring apparatus, decreases with a decrease in wavelength.

The invention provides a method of eliminating the effect of the secondary radiation on the calibration constant, when the wavelength varies. This method consists in that the said effect is compensated by the effect of the wavelength on the calibration constant, if a certain degree of absorption of the X-rays having passed through the gaseous contents of the large ionisation chamber is provided for.

In order to provide this absorption, use may be made of the wall of the ionisation chamber. For this purpose the wall requires a greater thickness than that hitherto used. As an alternative behind the ionisation chamber may be arranged a plate which forms, together with the rear wall of the ionisation chamber, the substance having the desired absorption power. The value of this power depends upon various factors, for example the spacing between the large ionisation chamber and the focal spot of the X-ray tube or the source of secondary rays. On their way through a body soft X-rays are absorbed more strongly than hard X-rays covering the same path. In view of the influence exerted by the wave-length on the phenomenon of X-ray absorption it may be concluded that the difference in radiation power in the large ionisation chamber and behind the said absorbing substance decreases with a decrease in wavelength. This means that, owing to the absorption, the calibration constant of the measuring apparatus increases with a decrease in wavelength.

Consequently relative to the first mentioned phenomenon the latter has an opposite effect on the deflection of the measuring instrument. In order to ensure the independence of the calibration constant of the measuring apparatus of the wavelength of the rays, the various factors affecting the said phenomena are chosen, in accordance with the invention, to be such that the effects compensate one another with a sufficient accuracy for practical purposes at least within a particular wavelength range. This result may be obtained by arranging a large ionisation chamber made of synthetic resin in a flat shape on the safety shield of the X-ray tube, preferably between the conventional ray filter and the fastening area of the ray funnel and by providing a suitable thickness, for example 1.5 mm. for the wall of the chamber.

In order that the invention may be more clearly understood and readily carried into effect, it will now be described more fully with reference to the accompanying drawing.

The single figure of the drawing is a sectional view of a shielded X-ray tube taken in a plane through the axis of the tube. For the sake of simplicity only the central parts of the X-ray tube and its safety shield are shown. The X-ray tube, the glass wall of which is designated 1, is housed in a metal safety shield 2. As an alternative the safety shield may be made of insulating material and is then usually provided with a conductive external coating. The X-ray tube comprises a copper anode 3 which is prolonged by a shoulder 4. The cathode of the X-ray tube is not shown; it is supposed to be on the left side of the anode in this figure. When the tube operates the electrons come from the left-hand side, enter through the opening port of the shoulder 4 into the field-free space 5 and find their way to the tungsten target 6, where they produce X-rays. The shoulder 4 has, on one side, an aperture which is closed by a metal foil 7, which allows the X-rays to pass freely but which retains the electrons.

The space 8 between the X-ray and the shield 2 is filled with insulating oil 16. The thickness of the oil layer, through which the X-rays have to penetrate on their path from the tungsten target to the outside, is reduced by a local contraction of the shield provided by the insulating body 9. The oil displacer 9 is surrounded by a central piece 10 of the shield, in which provision is made of an aperture which allows the X-rays to pass. Relative to the further part of the safety shield this central piece is rotatable about the axis, together with the X-ray tube itself, so that the outlet port for the X-rays is invariably opposite the metal foil 7. The aperture in the central piece 10 is closed by a slide 11, which comprises an exchangeable filter serving to control the quality of the X-rays emitted by the tube. Further to the outside the shield is provided about the port with an upright edge 12, to which a ray funnel may be secured.

The large ionisation chamber 13 is located inside of the edge 12, i. e. between the ray funnel (not shown) and the filter. The electrodes of this chamber and the current circuit connected thereto are not shown. All the X-rays emitted by the tube pass through this ionisation chamber. For the major part they emanate from the tungsten target 6, but in part also from the oil and the displacer 9, i. e. from any point from which may be drawn both a connecting line with the focal spot of the tube intersecting with the metal foil 7 and a straight line which passes via the outlet port of the safety shield, through the ionisation chamber. The range of these points is indicated in the figure by dots. It constitutes a secondarily radiating volume affecting the calibration constant of the measuring apparatus.

The variation of this influence occuring at a variation of the wavelength is compensated, in accordance with the invention, by the simultaneous variation of the influence exerted by the ray absorption in the rear wall 14 of the ionisation chamber 13 on the calibration constant.

It has been found that the thickness of this wall may be such that the indication of the measuring apparatus does not vary by more than 1% through a wavelength range having limit values associated with a thickness for half absorption of 0.1 and 1.1 mm. Cu.

The front wall 15 of the ionisation chamber need not have the same thickness as the rear wall 14, which is thickened for the purpose of absorption. It is advisable to render the front wall 15 thinner than the rear wall 14, so that the rays are less weakened by an additional filter. In order to ensure the required absorption, a separate plate of suitable thickness may, as an alternative, be provided behind the wall 14.

A kind of synthetic resin found to be particularly suitable for the manufacture of the large ionisation chamber and the absorption plate is the cast resin registered under the tradename of "Araldit," which is a condensation product of poly-arylethylene oxide derivatives.

What I claim is:

1. An X-ray apparatus comprising a source of X-rays including an X-ray tube for producing X-radiation for use at a point remote from the source, a shield surrounding the tube having an opening therein for the passage of the X-radiation to the point of use, a large ionization chamber attached to the shield in proximity to said source and in the path of the X-radiation between the tube and the point of use for measuring the X-radiation intensity in proximity to the source without substantially interfering with its transmission to the point of use, and a layer of material more absorbent of long wave-length radiation disposed on the side of the ionization chamber remote from the tube and in the path of said X-radiation, said layer having a thickness at which the ratio of radiation intensity measured by the ionization chamber and radiation intensity at the point of use is constant with a variation in the wave-length of the X-radiation from the source.

2. An X-ray apparatus comprising a source of X-rays including an X-ray tube for producing X-radiation for use at a point remote from the source, a shield surrounding the tube having an opening therein for the passage of the X-radiation to the point of use, a large ionization chamber attached to the shield in proximity to said source and in the path of the X-radiation between the tube and the point of use for measuring the X-radiation intensity in proximity to the source without substantially interfering with its transmission to the point of use, and a plate of X-ray absorbent material more absorbent of long wave-length radiation disposed on the side of the ionization chamber remote from the tube and in the path of said X-radiation, said plate having a thickness at which the ratio of radiation intensity measured by the ionization chamber and radiation intensity at the point of use is constant with a variation in the wave-length of the X-radiation from the source.

3. An X-ray apparatus comprising a source of X-rays including an X-ray tube for producing X-radiation for use at a point remote from the source, a shield surrounding the tube having an opening therein for the passage of the X-radiation to the point of use, and a large ionization chamber attached to the shield in proximity to said source and in the path of the X-radiation between the tube and the point of use for measuring the X-radiation intensity in proximity to the source without substantially interfering with its transmission to the point of use, said ionization chamber having a wall adjacent the tube and a wall more absorbent of long wave-length radiation disposed on the side of the ionization chamber remote from the tube and in the path of said X-radiation, said remote wall having a thickness greater than said wall adjacent the tube and at which the ratio of radiation intensity measured by the ionization chamber and radiation intensity at the point of use is constant with a variation in the wave-length of the X-radiation from the source.

4. An X-ray apparatus comprising a source of X-rays including an X-ray tube for producing X-radiation for use at a point remote from the source, a shield surrounding the tube having an opening therein for the passage of the X-radiation to the point of use, and a large ionization chamber attached to the shield in proximity to said source and in the path of the X-radiation between the tube and the point of use for measuring the X-radiation intensity in proximity to the source without substantially interfering with its transmission to the point of use, said ionization chamber having a wall adjacent the tube and a wall more absorbent of long wave-length radiation disposed on the side of the ionization chamber remote from the tube and in the path of said X-radiation, said remote wall consisting of a cast resin having a thickness greater than said wall adjacent the tube and at which the ratio of radiation intensity measured by the ionization chamber and radiation intensity at the point of use is constant with a variation in the wave-length of the X-radiation from the source.

References Cited in the file of this patent

UNITED STATES PATENTS

| | | |
|---|---|---|
| 2,094,318 | Failla | Sept. 28, 1937 |
| 2,221,374 | Farnsworth | Nov. 12, 1940 |
| 2,225,940 | Grossmann | Dec. 24, 1940 |
| 2,497,543 | Frevel | Feb. 14, 1950 |
| 2,534,126 | Hollstein | Dec. 12, 1950 |
| 2,537,914 | Roop | Jan. 9, 1951 |